(12) United States Patent
Leyvraz

(10) Patent No.: US 7,675,001 B2
(45) Date of Patent: Mar. 9, 2010

(54) METHOD AND A DEVICE FOR DEPOSITING A WIPE-PROOF AND RUB-PROOF MARKING ONTO TRANSPARENT GLASS

(75) Inventor: Philippe Leyvraz, Belfaux (CH)

(73) Assignee: Frewitt Printing SA, Corminboeuf (CH)

( * ) Notice: Subject to any disclaimer, the term of this patent is extended or adjusted under 35 U.S.C. 154(b) by 832 days.

(21) Appl. No.: 10/518,368

(22) PCT Filed: Jun. 18, 2003

(86) PCT No.: PCT/CH03/00396

§ 371 (c)(1),
(2), (4) Date: May 9, 2005

(87) PCT Pub. No.: WO04/000749

PCT Pub. Date: Dec. 31, 2003

(65) Prior Publication Data

US 2005/0218126 A1    Oct. 6, 2005

(30) Foreign Application Priority Data

Jun. 19, 2002    (CH) ..................................... 1041/02

(51) Int. Cl.
*B23K 26/00*    (2006.01)
*B23K 26/40*    (2006.01)

(52) U.S. Cl. ............................. 219/121.68; 219/121.69; 216/31

(58) Field of Classification Search ...............................
219/121.61–121.72, 121.83; 65/105, 112; 216/31; 347/224
See application file for complete search history.

(56) References Cited

U.S. PATENT DOCUMENTS

| | | | | |
|---|---|---|---|---|
| 3,991,883 A | * | 11/1976 | Hobler et al. | ................ 209/524 |
| 4,166,574 A | * | 9/1979 | Yokoyama | ................... 235/375 |
| 5,172,326 A | * | 12/1992 | Campbell et al. | ........... 700/134 |
| 5,321,227 A | * | 6/1994 | Fuchs et al. | ............. 219/121.68 |
| 5,874,011 A | * | 2/1999 | Ehrlich | ......................... 216/65 |
| 6,075,223 A | * | 6/2000 | Harrison | ................ 219/121.85 |
| 6,160,568 A | * | 12/2000 | Brodsky et al. | .............. 347/247 |
| 6,160,835 A | * | 12/2000 | Kwon | .......................... 372/108 |
| 6,211,485 B1 | * | 4/2001 | Burgess | .................... 219/121.7 |
| 6,291,551 B1 | * | 9/2001 | Kniess et al. | ................ 523/216 |
| 6,383,046 B2 | * | 5/2002 | Shinoda | .......................... 445/3 |
| 6,403,919 B1 | * | 6/2002 | Salamon | ................ 219/121.69 |
| 6,492,615 B1 | * | 12/2002 | Flanagan | ................ 219/121.66 |
| 6,552,301 B2 | * | 4/2003 | Herman et al. | ......... 219/121.71 |
| 6,621,041 B2 | * | 9/2003 | Hayashi et al. | ......... 219/121.67 |
| 6,634,186 B2 | * | 10/2003 | Abe | ............................ 65/105 |
| 6,638,440 B1 | * | 10/2003 | Grimard | ....................... 216/31 |
| 6,869,749 B2 | * | 3/2005 | Hayashi et al. | .............. 430/290 |
| 2001/0009707 A1 | | 7/2001 | Dickinson, Jr. | |
| 2001/0023825 A1 | * | 9/2001 | Frumin et al. | ................ 204/458 |
| 2003/0176987 A1 | * | 9/2003 | Nakajima | ................... 702/159 |

FOREIGN PATENT DOCUMENTS

| | | |
|---|---|---|
| DE | 100 50 263 | 4/2002 |
| DE | 100 50 263 A1 | 4/2002 |
| EP | 0352362 | 1/1990 |
| EP | 0 354 362 | 2/1990 |
| JP | 09128578 | 5/1997 |
| JP | 02001062579 A * | 3/2001 |

OTHER PUBLICATIONS

Product News Sprechsaal (Muller & Schmidt), 452 Journal of Aircraft, No. 8 (Aug. 1988) (2 pgs).
Buerhop, Claudia, "Surface treatment of glass and ceramics using XeCl excimer laser radiation," Glastech Ber. 88 (1993), No. 3 (4 pgs).
Buerhop et al., "Surface treatment of glass and ceramics using XeCl excimer laser radiation," Glastech Ber; Glastechnische Berichte, vol. 66, No. 3, (Mar. 1993), pp. 61-67.

"Product News," Sprechsaal, Verlag Des Sprechsaal Muller Und Schmidt, Coburg, DE, vol. 121, No. 9 (1988), pp. 708, 710, 712, 71 XP000021087, ISSN: 0341-0676.

Patent Abstracts of Japan, vol. 1997, No. 9, (Sep. 30, 1997) & JP 09 128578 A (Pewxiaion: KK; Daiichi Glass KK), May 16, 1997.

* cited by examiner

*Primary Examiner*—Samuel M Heinrich
(74) *Attorney, Agent, or Firm*—Nixon & Vanderhye P.C.

(57) ABSTRACT

A device for depositing a wipe-proof and rub-proof marking or code marking, in particular a two-dimensional matrix or line coding onto glass receptacles such as glass ampoules, glass bottles, vials and likewise, comprises a transport means having a drive, with one or more accommodating devices for objects to be inscribed, a laser system arranged at a distance to the transport means with a laser source for producing a laser light beam of a wavelength <380 nm, said laser light beam in operation being directed onto the transport path and defining an impingement point in the region of at least one accommodating means moved along the transport path, means in order to deflect the laser light beam in a first and in a second direction continuously or in certain incremental intervals, and at least one control unit comprising a memory unit and a microprocessor which is in connection with the laser system and the deflection means, for controlling at least the deflection system and the laser system. The device further comprises a transport means designed for the transport of glass receptacles to be marked, along a transport path, a means for detecting or determining at least the position of at least one accommodating means or a glass receptacle accommodated therein at least one position along the transport path, said means being in connection with the control unit, and a program stored in the memory unit, which triggers the laser in dependence on the position of the glass receptacle to be inscribed, as well as at least one marking pattern, according to which the deflection means for writing the 2D marking is moved in a first and in a second direction. A read means is provided or arranged at a defined read position along the transport path after the laser system in the transport direction for detecting the marking previously written by the laser system, said read means being in connection with the control unit. In the control unit there is further present a program or a program procedure which compares the stored marking pattern to the marking detected by the read means and provides a control signal in dependence on the result of the comparison, at the output of the control unit.

36 Claims, 5 Drawing Sheets

“METHOD AND A DEVICE FOR DEPOSITING A WIPE-PROOF AND RUB-PROOF MARKING ONTO TRANSPARENT GLASS

This application is the US national phase of international application PCT/CH03/00396 filed on Jun. 18, 2003, which designated the US. PCT/CH03/00396claims priority to CH Application No. 1041/02 filed Jun. 19, 2002. The entire contents of these applications are incorporated herein by reference.

TECHNICAL FIELD OF THE INVENTION

The present invention relates to a method and to a device for depositing a wipe-proof and rub-proof marking or code marking, in particular a two-dimensional code marking, onto glass or glass containers such as syringes, ampoules, vials, bottles and likewise.

STATE OF THE ART

In the pharmaceutical industry it is compellingly necessary to provide medication with a marking (subsequently also called code or code marking) in order to be able to trace back the path of these medications. The code distinguishing the pharmaceuticals should at least provide details as to when and in which manufacturing process a medication has been manufactured. It is however desirable to mark the medications with an individual code. An individual code permits the path of each individual medication to be traced (lot number and expiration date, mandatory).

There are various standardised codings which are used in practise. Bar codes on printed packagings with which a sequence of black bars on a white background form the code marking is generally known. These code markings are manufactured by a printing procedure or by removal of the uppermost layer with a material constructed of contrasting layers. The reading of the bar codes is effected by a light beam which is led uniformly over the code marking. The light reflected by the marking is registered and evaluated.

Apart from bar codes standardised 2 dimensonal codes are often also used. In general, matrix codes are identified by a square representation of round, squared or other shaped data cells. Datamatrix codes as a rule are formed as two-dimensional point matrices with 10×10, 8×18, 8×32, 12×26, 20×20 etc. up to 144×144 points. Since a large number of different information may be stored with a two-dimensional datamatrix, with a datamatrix products which otherwise may not be differentiated may be completely individualised.

In practise pharmaceuticals are distinguished in that a code marking is written onto a label which then is deposited onto the container by way of a labelling machine. Known techniques could be used for writing the code. A code may be written on the container with ink in a simple and inexpensive manner. Ink-jet printing devices have found widespread use, these are inexpensive and reliable. The disadvantage with labelling by way of writing inks is however the fact that the labelling is usually not wipe-proof and/or rub-proof. On the other hand one advantage is the fact that e.g. ink-jet printing devices require only very little space. Accordingly these may be easily integrated into filling lines.

Alternatively a code may also be directly written onto the container without using a label. One technique commonplace in the pharmaceutical industry for directly distinguishing glass ampoules uses differently coloured rings in order to produce code markings. For this purpose, one to maximal five rings of different colours are deposited on the neck of the ampoules. Furthermore up to 8 different colours are used. The limited number of rings and the different colours however do not permit each individual sample to be individualised which would be desirable, but as a rule only permits details with regard to the batch in the manufacturing process. The advantage of the described coding of the ampoules by way of the rings is however the fact that the writing means may be integrated into the filling lines. The colour ring code on ampoules allows only product number, sometimes lot number coding. For vials, the industry uses a combination of a coloured plug and a coloured cap to differentiate product or lot. None of these technologies allow a unique serial number (not enough possibilities).

A wipe-proof marking on glass ampoules may be manufactured with screen-printing. With this the code is firstly written onto the ampoules by screen-printing, and then the printing ink is burnt into the ampoules. Until now such glass ampoules had to be manufactured in a separate working process away from the filling installations and prior to the filling process. This however entails considerably more expense since the code marking until now had to be deposited onto the ampoules by the manufacturer of the ampoules. This is complicated and makes the filling procedure considerably more expensive.

In the pharmaceutical industry it is very important to be able to print or code ampoules, small glasses etc. very quickly. Filling maclines are capable of filling 200 and more ampoules, small glasses or cartridges per minute, and it is to be assumed that future filling means will be capable of filling up to 600 ampoules, small glasses or cartridges per minute. As a result the printing devices must be able to print up to 10 containers per second.

On the other hand it is important to the pharmaceutical industry for the markings to be easily readable so that the products may be unambiguously identified. There furthermore exists the requirement for a marking device which permits individual and rub-proof markings to be manufactured in a controlled manner.

The filling installations applied in the pharmaceutical industry consist of the following stations: washing station→sterilisation→filling station→marking station (ring code)→labeling machine. With this sterile conditions only prevail between the sterilising station and the filling installation.

The application of laser light sources has been suggested for many years for depositing a marking code onto returnable PET plastic bottles. EP-A-0 354 362 discloses a method with which recesses are manufactured in the surface of bottles by way of a laser. According to EP-A-0 354 362 the recesses are to be formed in a manner such that the base of each code marking acts as a diffusely scattering reflector. For this purpose the use of a mask is suggested which is arranged in the beam path. Each opening in the mask is covered over with a bar grid, a point grid or simply with a screen. For automatically reading the special code markings one uses a sensor constructed of light-guide fibres with a centrically arranged emission light-guide fibre. The sensor forms an angle of less than 90° with the surface of the bottle so that light is reflected into the sensor only at locations of the surface where markings are present.

According to EP-A-0 354 362 the method is basically also applicable to glass bottles. Attempts by the inventor have however shown that with point coding used in practice nowadays it is practically impossible to form a point of the point matrix as a diffusely scattering reflector, similar to a cat's eye. This is impossible already due to the fact that an individual point occupies an area of significantly less than 1 mm².

Accordingly it was neither possible to read the point coding with a sensor with a centrically arranged emission light-guide fibre. The use of a CCD camera failed due to the fact that the contrast between the written and bordering area is not sufficient to be able to reliably read the point pattern.

WO 92/15963 relates exclusively to the coding on plastic bottles. WO 92/15963 teaches fixing the plastic bottle with respect to the conveyor means and guiding the laser beam essentially along the bottle axis or at a slight inclination angle to this onto a bottle surface having a horizontal component. This method has the advantage that the intensity of the laser light impinging the surface of the bottle per unit of spatial angle is constant. The code marking may allegedly be recognised without any difficulty. A scanning of the marking is not required. It is also not required to produce the base surfaces with special reflection properties.

EP-A-0 354 362 as well as WO 92/15963 do not give any details as to which wavelengths are required for the production of the marking. EP-A-0 354 362 however mentions the application of a gas laser or a YAG laser. The $CO_2$ as well as YAG laser applied in machining of the surface function with wavelengths >1000 nm. It is generally known that electromagnetic radiation of this wavelength is completely absorbed even by transparent plastic. With a sufficient intensity of the laser beam the plastic at the locations radiated with wavelengths >1000 nm melts and evaporates. Recesses of approx. 100 µm arise, and the plastic changes its optical properties.

DE-A-100 50 263 discloses a method and a device for inscribing curved surfaces of optical elements of a silicate or plastic material, such as spectacle glasses with short-wave UV light which in particular is produced by an excimer laser. It is the aim of DE-A-100 50 263 to deposit order numbers onto the spectacle glasses in order to increase the safety from copying, i.e. with the order numbers it is the case of inscriptions which may be easily read by the eye. According to DE-A-100 50 263 the light beam irradiated by the laser is focussed by way of an optical individual element. The surface to be distinguished and the focus point of the light beam are displaced relative to one another in the direction of the tangential plane in the apex of the surface, and additionally the surface to be distinguished is displaced in the direction of the normal in the apex in a manner such that the focus point always lies on the surface. The method suggested by DE-A-100 50 263 in particular has the advantage that the use of a mask may be done away with and accordingly the power of the applied laser may be lower than with other methods, which lead the laser beam through a mask. By way of the simultaneous displacement of the surface in the direction of the normal in the apex of the surface one further obtains a uniform size and shape of the focus point also with curved surfaces.

The device for carrying out the method uses a galvanometer mirror, which deflects the light beam over the tangential plane. The part to be inscribed is arranged on a displacement table which may be displaced normally to the tangential plane. A control unit permits the light source, the galvanometer mirror and the displacement table to be controlled in allocation to the desired distinguishing or coding, as well as to the shape of the object to be inscribed. At the same time it becomes possible to inscribe spectacle glasses individually, for example with order numbers. On the other hand the disadvantages of the method and the device of DE-A-100 50 263 are that the object to be inscribed must be moved perpendicularly to the tangential plane in the apex of the surface in dependence on the curvature of the surface to be inscribed. This demands very accurate mechanics and control of the writing process. Furthermore the respective curvature of the surface to be inscribed must be stored in the control unit. Due to the necessary complicated handling the inscription method is not suitable for inscribing a very large number of objects in a certain time unit, as this is required in the pharmaceutical industry. The device of DE-A-100 50 263 does not disclose means for controlling the inscription, or a transport means.

U.S. 2001/0009707 discloses a glass having a textured pattern comprising depressed, conical areas at spaced intervals on the surface. The method of texturing a surface on a glass body comprises exposing the surface to laser radiation having a wavelength that is substantially absorbed by the material of the surface. For texturing the surface either the body or the laser may be translated periodically. It is proposed to use UV radiation from about 193 nm to about 351 nm which can be produced by excimer lasers.

In an article with the title "Surface treatment of glass and ceramics" (Glastech. Ber. 66, (1993), No. 3) the use of excimer lasers for fast and contactless marking of glass and ceramics is discussed. In said article the marking of glass by means of laser irradiation and using a mask was examined. It was found that material removal starts when the laser power exceeds a material-specific energy density threshold. The ablation rate as well as the ablation threshold depended on physical properties of the material and the laser parameters, like energy density, number of applied pulses, pulse repetition rate etc.

In 1988 the firm Lambda Physik announced a new method to mark glass material by means of an excimer laser (Sprechsaal, Vol. 121, No. 9, page 708). The laser used has a performance of more than 1 MW (1'000'000 Watt)/cm2. They have found that each laser pulse results in the evaporation of a 0.1 µm layer. The depth of the mark can be controlled by the number of laser pulses applied.

Japanese patent application JP-A-09 128578 discloses a mold number managing method wherein a mold number and a trademark are successively engraved onto the bottom of the bottle. The mark can be read by a CCD camera as a uniform and sharp mold number image. By the method the mold number recognition rate is improved.

Although it has been known for many years that with the UV light produced by excimer lasers one may engrave markings directly into the surfaces of glass and ceramic bodies, as in the past a coding with colour rings is used for containers for keeping pharmaceuticals. This is not least due to the fact that until now there have not been available any suitable or satisfactory alternative solutions. Suitable solutions in particular must permit a large throughput and reliability, an individualisation of the receptacles and a good readability. There should furthermore exist no danger of the receptacle suffering damage on inscription or that its inner space becomes contaminated. With regard to this one had reservations with respect to laser inscription since the glass may be damaged at the irradiated locations (cracks).

OBJECT OF THE INVENTION

It is the object of the present invention to suggest a method and a device for the direct and unambiguous distinguishing of preferably transparent glass receptacles without the application of masks. A further object is to suggest a method and a device in order to engrave a wipe-proof marking or inscription into the surfaces of glass ampoules, syringes, small glasses and likewise, in particular a machine-readable two-dimensional point or line code (datamatrix). It is further an object to suggest a method and a device with which markings may be written onto moved glass objects ("on the fly"). A further object is to suggest a method and a device or a system with which a rub-free marking or code marking may be written into curved surfaces, in particular into surface areas of round glass receptacles. It is yet a further object to deposit rub-proof and non-manipulatable markings onto transparent glass without the use of masks or additional coatings and without damage to the glass. A further object is to suggest a complete solution for the manufacture of rub-proof, individual markings of pharmaceutical receptacles which may be integrated into existing filling installations and which in particular meets the requirements of the pharmaceutical industry.

SUMMARY

According to the invention this object is achieved by a method with the features of claim 1. By way of a transport means a large number of glass receptacles may be transported past a laser. By way of detecting the position of a glass receptacle and as the case may be the transport speed of the transport means the laser beam may be triggered at the right moment and a marking pattern stored in a memory medium engraved into the surface. The marking engraved into the surface may be scanned and detected directly after the writing procedure by way of a suitable read means and may be compared to the marking pattern stored in the memory medium. By way of a comparison of the predefined code pattern with the actually written code pattern one may ascertain immediately whether the inscription is OK. One may thus meet the demand of a hundred percent retracability of the samples. Thus a mixing up of medications may no longer occur on account of a marking engraved into the glass surface. Thus for the first time the various demands of the pharmaceutical industry with regard to a new type of distinguishing of ampoules, syringes, small glasses and vials may be fulfilled with the method according to the invention. Furthermore the device according to the invention may be integrated into existing filling installations. The application of a laser with a wavelength <380 nm, as trials of the inventor have shown, has the great advantage compared to commonly applied $CO_2$ laser that the locations of the glass surface treated with the laser are subjected to a much lower thermal stress, and therefore the danger that the glass may be damaged here is practically zero. Furthermore by way of deflecting the laser beam in two directions one may very rapidly inscribe samples.

Usefully the laser beam is deflected by way of an activatable 2D scanner mirror in the x- and y-direction. This 2D scanner mirror deflectable in two directions may for example be a known galvanometer mirror or be deflected by way of magnetic, electrostatic or piezoelectric effects. The mirror should have enough dynamic to modulate the laser beam fast enough to raster the complete pattern in the short time available (typically less than 200 ms)

According to a particularly preferred method variant the focus depth of the laser beam in the region of the writing surface is set to >0.2 mm, preferably >0.5 mm and very particularly preferred >1.0 mm. This has the advantage that an exact adjustment of the samples relative to the laser beam is not required. Furthermore one may also inscribe curved surfaces. The curved surfaces may at the same time have radii of 3 mm and larger. A further advantage is the fact that the distance of the objects to be inscribed in the axis of light may change during the writing operation. This for example is the case if the objects are transported on a carousel. The energy density of the applied laser beam is to be usefully set such that the threshold value at which material removal is effected is exceeded. Advantageously the laser beam is set to an energy density of >2 J/cm², preferably >5 J/cm² and very particularly preferred >10 J/cm².

In principle the glass receptacle may be stationary and the laser light beam for writing the coding may be moved during the depositing of the coding. However it is advantageous for the glass receptacles to be transported continuously and preferably at the same transport speed, and the laser beam is tracked according to the transport speed of the objects. With the continuous transport the throughput may be significantly greater than with a transport in steps.

The laser beam is preferably activated such that for writing a single data point or pixel the impinging points of the light impulses in each case at least partly overlap. This has the advantage that in the glass a well visible matt surface is produced which has a good contrast relative to the bordering non-machined areas. Advantageously each data point or pixel of the code marking is formed by two or more tracks or channels lying next to one another. This means that a n×m datamatrix is divided in at least 2n, 3n, 4n etc. or 2m, 3m, 4m tracks (see FIG. 7).

Advantageously a laser light beam of a wavelength of <300 nm, in particular 265 nm or 253 nm is applied. These frequencies may be produced by known excimer lasers or solid-state lasers with frequency multiplication means. Preferably a Nd YAG laser with a frequency working at the $3^{rd}$ harmonic is applied. Such lasers are more economical and also smaller than excimer lasers so that the inscription means may also be integrated into existing filling lines. Usefully recesses of only <20 μm, preferably <10 μm are produced in the glass surface with the laser light beam. The writing procedure may be relatively quick on account of the low material removal.

Preferably an object $O_2$ following the object $O_1$ with the marking $M_a$ is provided with a marking $M_b$, a subsequent object $O_3$ is provided with a marking $M_c$, etc. The glass receptacles may be individually distinguished in this manner.

According to an advantageous further development of the method, the location of the glass to be inscribed is coated with a liquid or solid substance or substance mixture on the laser impinging surface. Surprisingly the writing procedure then becomes more efficient and quicker. The writing procedure surprisingly already becomes more efficient if the location of the glass to be inscribed is previously moistened. Alternatively at least one layer of a compound adhering well to glass, e.g. of a grease or of another UV-absorbing substance may be deposited onto the location to be inscribed. A coating before the inscription procedure may furthermore improve the contrast ratio between the inscribed and non-inscribed glass locations.

Advantageously immediately following the inscribing operation the readability of the marking is checked by way of a read means, in particular a CCD camera. With this receptacles with an erroneous marking may be rejected immediately, i.e. before they are filled. In those cases where marking occurs after filling, bad parts are immediately rejected, before going to the next production step. In a further development of the method, for producing an improved contrast ratio between the inscribed and non-inscribed glass surfaces the marking is not illuminated directly, but light is introduced into the glass wall of the glass receptacle at a distance to the code marking. In this manner the contrast ratio may be surprisingly improved so much that the marking written into the glass is easily readable. One may reliably recognise the marking by arranging at least one light source above and below and at a distance to the marking and by way of preventing the direct impinging of light onto the marking and the read means by way of a shielding, the marking may be reliably recognised.

The subject matter of the present invention is also a device for depositing a wipe-proof and rub-proof marking, in particular a two-dimensional point coding, according to the preamble of claim 16, which is characterised in that the transport means is designed for the transport of glass receptacles to be marked, along a transport path and in a transport direction defining a transport stretch, a means for detecting or determining at least the position of at least one accommodating means or a glass receptacle accommodated therein is provided at least one position along the transport path, said means being in connection with the control unit, in the memory unit there is stored a program which triggers the laser in dependence on the position of the glass receptacle to be inscribed, as well as at least one marking pattern, according to which the deflection means for writing the 2D marking is moved in a first and in a second direction, a read means is provided or arranged at a defined read position R along the transport path after the laser system in the transport direction, for detecting the marking previously written by the laser system, said read means being in connection with the control unit, and that in the control unit there is further present a program or a program procedure which compares the stored marking pattern with the marking detected by the read means and provides a control signal in dependence on the result of the comparison at the output of the control unit.

By way of the transport means a transport stretch of a certain length is defined, along which the write operation as well as the read operation is effected by the write and read means, respectively. This has the advantage that the inscribed object does not have to be additionally manipulated (rotated) in order to read the code marking.

The position detection means is preferably an encoder which in dependence on the transport speed of the transport means delivers signals (impulses) to the control unit. The signals originating from a preferably incremental encoder may be used to determine the position of the objects to be inscribed or the receiving (accommodating) means for the objects. Alternatively or additionally the speed of the transport means may be determined from the signals provided.

With the continuous transport of the objects to be inscribed during the writing operation the knowledge of the speed of the transport means may be used to correct or track the deflection of the laser light beam by the transport speed. The application of an encoder also has the great advantage that the laser system inscribes in dependence on the speed of the transport means and thus the control of the device may be relatively simple. It is conceivable for the scanner mirror to have a separate control and regulation unit which may process the encoder signals so that the laser beam can be tracked or moved in accordance with the transport speed of the objects.

Usefully the drive of the transport device, e.g. a servomotor ensures a uniform transport speed of the transport means. According to a particularly preferred embodiment example the program of the control unit ensures that on writing (engraving) the laser beam is tracked in the transport direction in dependence on the transport speed of the transport means. By way of this it is possible to inscribe the objects "on the fly". Thus a high throughput is possible.

The focussing means present in the beam path of the laser light beam, e.g. a convergent lens, a concave mirror or likewise may focus the laser light beam into a write plane. The focussing means preferably has a focal width f of more than 5 cm, preferably more than 10 cm, and very particularly preferred more than 15 cm. With a long focal width the focussing depth may be deeper. Although in principle one may apply an excimer laser, the device preferably uses a NdYAG laser with frequency multiplication means, in particular means for quadrupling the frequency.

By way of the application of a deflection means which are pivotable in a controlled manner about two pivot axes orthogonal to one another one may write any markings such as numbers or letters, bar and point codes, in particular two-dimensional markings (M×N matrices) without the application of a mask.

A read position is advantageously provided along the transport path at which a light source is present which is arranged such that only a part of the inscribed glass receptacle, but not the marking may be directly irradiated. In this manner the contrast ratio may be improved so much that the marking written by way of UV-light may be read by a CCD camera. Usefully at a short distance to the light source there is provided at least one opaque shielding which is designed such that a direct incidence of light onto the CCD camera and the marking is prevented. In one advantageous further development there are provided two light sources lying opposite one another and arranged on oppositely lying sides of the transport path, which are so arranged and in each surrounded by a shielding such that on transport past these only a part of the glass receptacle, but not the marking, is directly irradiated by the light sources.

According to another, independent aspect the subject matter of the present invention is a device according to the preamble of claim 29, which is characterised in that a means is provided for detecting at least the position and preferably the speed of the transport means, said means being in connection with the control unit, in the memory unit there is stored a program which on operation triggers the laser in dependence on the position of the glass receptacle to be inscribed, as well as at least one marking pattern, according to which the deflections means for writing the 2D marking is moved in a first and a second direction, and there is provided a program or logic circuit which tracks the laser beam according to the transport speed of the objects to be inscribed.

This device has the advantage that moved object may be inscribed "on the fly" with a marking, code, numbers or letters. In particular this permits a larger number of objects to be inscribed than a transport in steps. Further aspects of the invention are defined in the subclaims and have already been discussed above.

According to another independent aspect the subject matter of the present invention is a device according to the preamble of claim 33, which is characterised in that by way of the focussing means one may produce a focus depth of more than 0.2 mm, preferably more than 0.5 mm, and very particularly preferred more than 1 mm. Typically the focus depth is roughly 2 mm. By way of this the exact position of the objects to be inscribed is of less importance. Furthermore one may also inscribe curved surfaces without the distance between the laser optics and the surface of the object having to be changed, as this for example is the case with the device of DE-A-100 50 263. It is however important that the laser beam has an essentially uniform diameter or one that does not vary too much over the region of the claimed focus depth, and the energy density of the laser beam is greater than the ablation threshold which depends on the material to be inscribed. Preferably the energy density is $>2$ $J/cm^2$, preferably $>5$ $J/cm^2$ and very particularly preferred $>10$ $J/cm^2$. Further aspects of the device are defined in the already discussed dependent claims.

BRIEF DESCRIPTION OF THE FIGURES

Hereinafter the invention is described by way of example with reference to the figures. There are shown in FIG. 1 schematically, a laser system, a read means and carousel means for the transport of ampoules.

DESCRIPTION OF THE EMBODIMENT EXAMPLES

Figure 1:
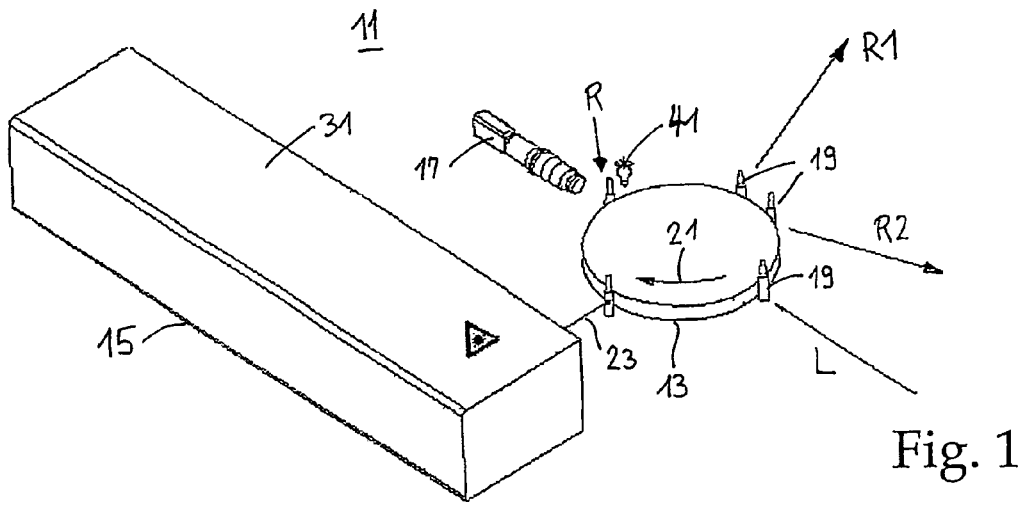
Figure 2:
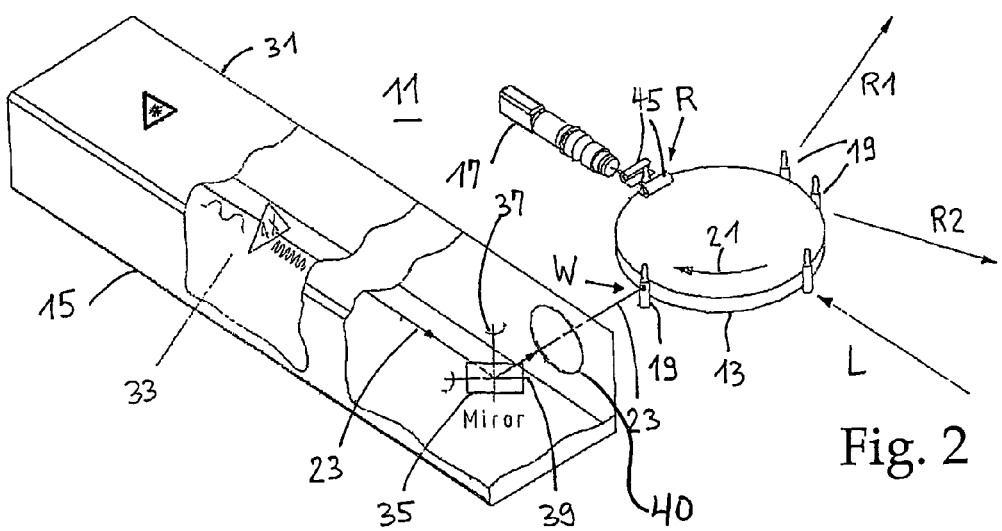
FIG. 2 the arrangement of FIG. 1 in more detail, wherein the laser system is shown partly in section.

The device 11 for depositing a code marking shown in the FIGS. 1 and 2 has a transport device designed in the shape of a carousel 13, a laser system 15 arranged at a distance to the transport path of the carousel 13, as well as a read means 17. The transport device 13 provides accommodating means 20 (FIG. 8) and transports glass receptacles 19 to be coded, e.g. glass ampoules, small glass bottles or vials, in a certain transport direction (arrow 21). The carousel 13 is charged with a glass receptacle 19 at a charging position L by way of a robot arm not shown in more detail, or a known charging device. A high-energy laser light beam 23 of the laser system 15 writes a code marking, in particular a matrix code 25 (see Fig. 5a-5c and 7)onto the glass surface of receptacle 19 at a coding position W which follows in the transport direction. At a subsequent read position R the written code marking 25 is then checked by a read means 17 with at least one CCD camera. If the read code marking corresponds with the sample pattern of the code marking the receptacle 19 in a subsequent filling station which is not shown is subsequently filled with a medication and closed. If the written code marking 25 may not be read without errors, then the receptacle 19 is rejected.

The transport device itself is not the subject-matter of the present invention. The transport device may also be a linear transport means. It is merely significant that according to one preferred embodiment form the glass receptacles 19 to be coded may be unmovably arranged on the transport device relative to this in an accommodating means not shown in more detail. For writing a two-dimensional code 25, this means that the laser light beam 23 needs to be deflected in a first and a second direction. It is however basically also conceivable to keep the writing beam stationary and instead of this then to move the glass receptacle.

The shown laser system 15 is arranged in a housing 31. In a preferred embodiment it consists of a laser source not shown in more detail, a means 33 for doubling, tripling or quadrupling the laser base frequency so that there results a laser light wavelength of ⁢365 nm, preferably <300 nm, as well as an activatable laser beam deflection means, preferably in the form of an activatable scanner mirror 35. The mirror 35 is pivotable about two pivot axes perpendicular to one another, specifically a pivot axis 37 and a pivot axis 39 orthogonal to the axis 37. The scanner mirror 35 may be a ready to use device comprising its own control unit which allows tracking the laser beam according to the speed of an object to be inscribed.

The frequency of a laser beam originating e.g. from a YAG laser with a wavelength of 1060 nm may be increased to a quadruple of this by way of a frequency-quadrupling crystal 33, so that there results a laser light beam of 265 nm. The laser light beam 23 impinges the mirror 35 and then for writing a code marking is deflected by a controlled pivoting of the mirror 35. In the light path after the mirror 35 there is arranged a focussing lens 40 for focussing the deflected laser-light beam 23 into a write plane forming also a tangential plane to surface to be inscribed.

Figure 3:
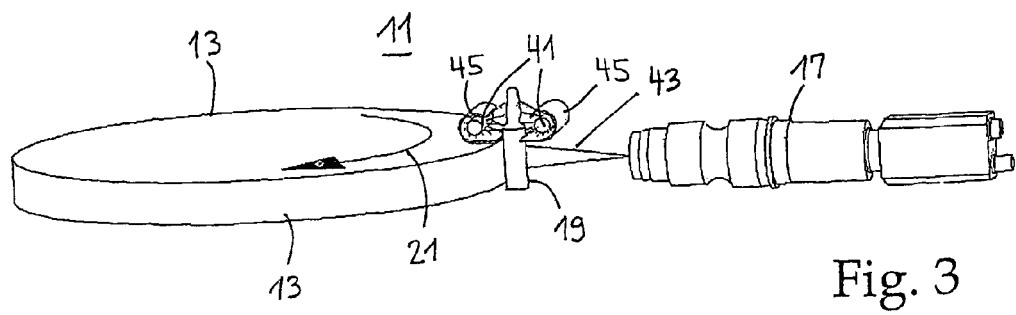
FIG. 3 the read means in more detail.

According to one advantageous further formation of the invention the read means is a CCD camera 17 as shown in detail in Fig. 3. The camera 17 is arranged at a distance to the transport device 13 and with respect to the transport path is arranged at roughly the same height as the writing beam 23. At least one light source 41 is arranged at a distance to the detection field 43 of the CCD camera so that the code marking 25 is not directly illuminated. For this purpose there are provided shieldings 45 which shield the light beam with respect to the camera opening and the code marking. By way of this arrangement of the light source 41 it may be achieved that the regions of the glass surface exposed to the laser beam 23 may be significantly differentiated. Surprisingly the contrast of the partly transparent code marking with respect to the bordering, completely transparent glass surfaces may be greatly improved so that the deposited code markings may be reliably detected by the CCD camera A read apparatus which is suitable for reading a 2D code is for example the 2D code reader of the company Sick AG obtainable on the market under the description ICR 850.

The marking is preferably to be illuminated indirectly for achieving a contrast ratio which is sufficient for the reliable detection of the written marking. This may be effected by the introduction of light into the glass wall which contains the coding. By way of the introduction of light into the glass wall it is achieved that the code marking is not directly irradiated. The light led into the glass wall propagates as in a light-guide. If the light impinges the recesses of the code marking, then it increasingly exits at these recesses and thus considerably improves the readability of the coding.

Figure 4:
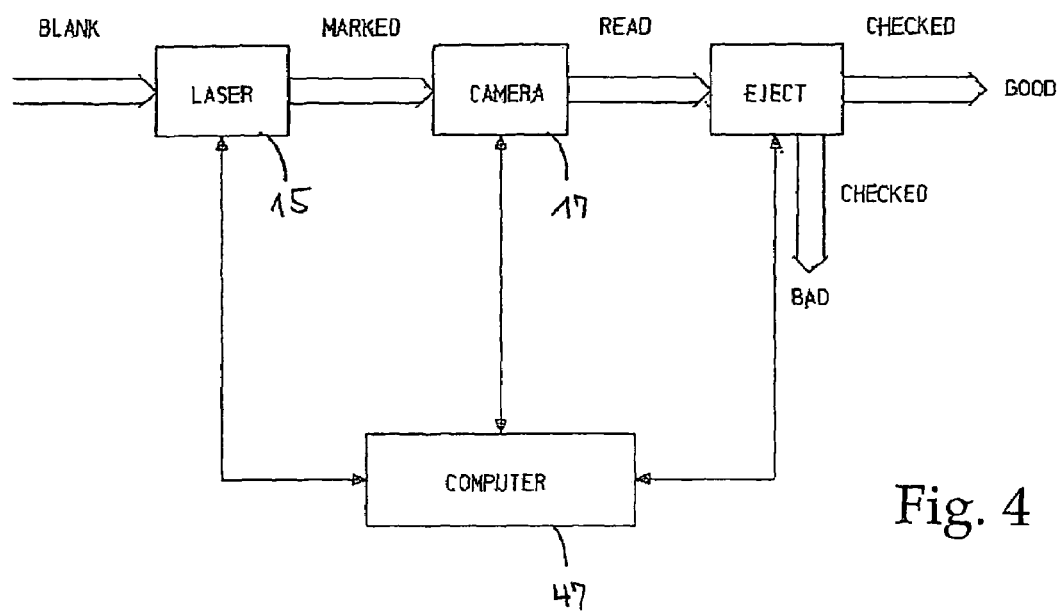
FIG. 4 schematically, the control of the coding device.
Figures 5A, 5B, 5C:
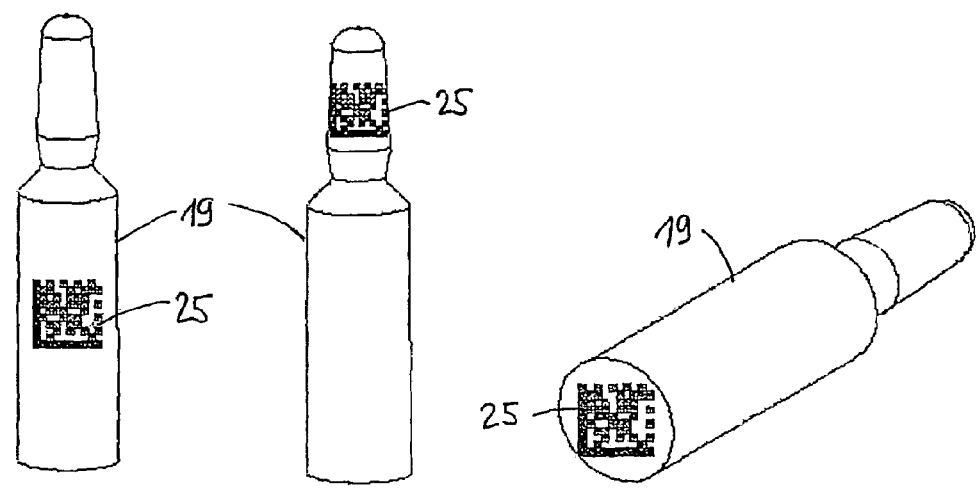
FIG. 5a) to c) bottles with exemplary deposited code markings.

The coding device 11 is preferably controlled and monitored by a central computer 47 (FIG. 4). The computer 47 is at least in connection with the transport device 13 (not shown), the laser system 15 as well as the read means 17. Apart from this the computer may also control the handling systems required for the operation of the coding device as well as the charging and unloading of the transport device.

FIG. 5 shows various ampoules provided with a two-dimensional (2D) point code (datamatrix) comprising inscribed and non-inscribed areas or data points. The 2D point code is composed of a plurality of such single data points or pixels which can only be read and interpreted by a machine (scanner means) and corresponding software means.

Figure 6:
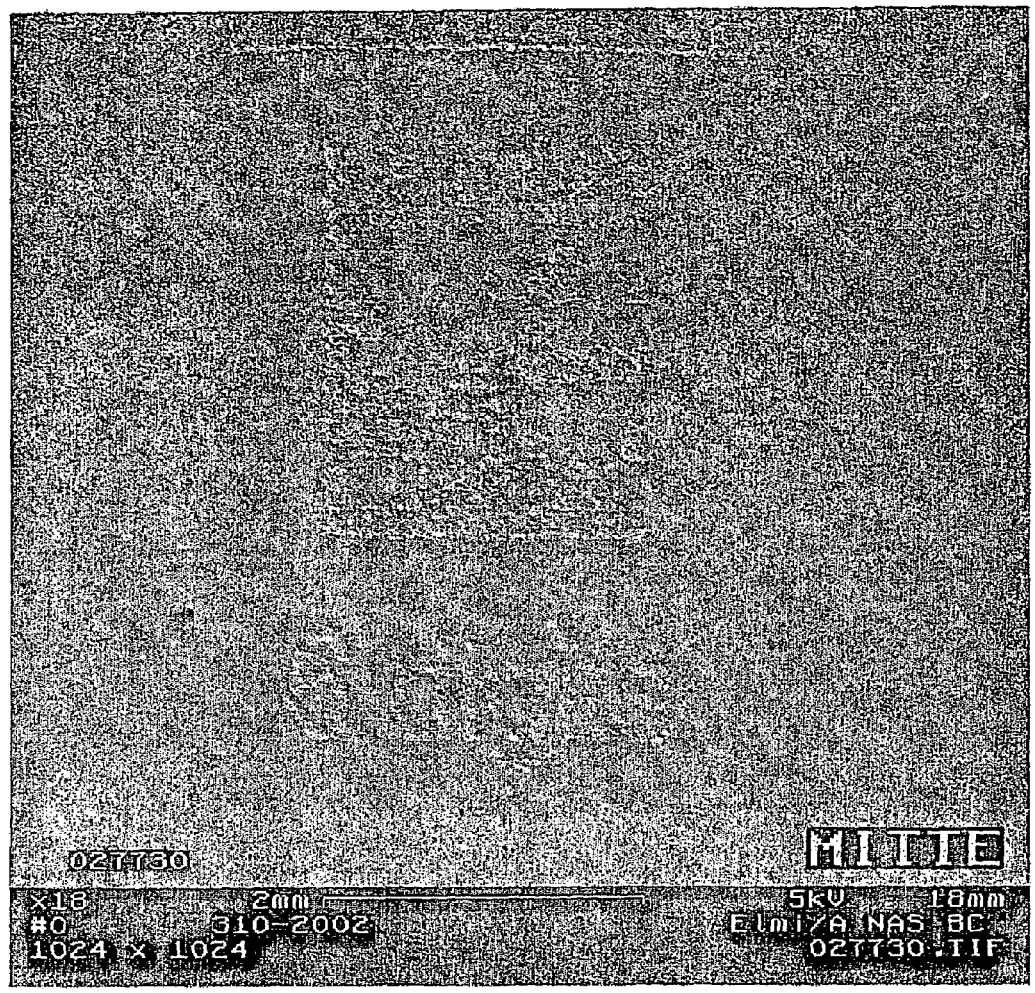
FIG. 6 in an 18× enlargement, one example of a marking deposited with a laser light beam of a wavelength of 266 mm and an energy density of 106 J/m$^2$.

In FIG. 6 there is represented one embodiment example of a code marking which has been produced by removal of a thin glass layer from the surface of a glass plate. On the electron microscope image it may be clearly recognised that the glass locations irradiated with the laser beam are roughened and are no longer smooth as the adjacent regions.

Figure 7:
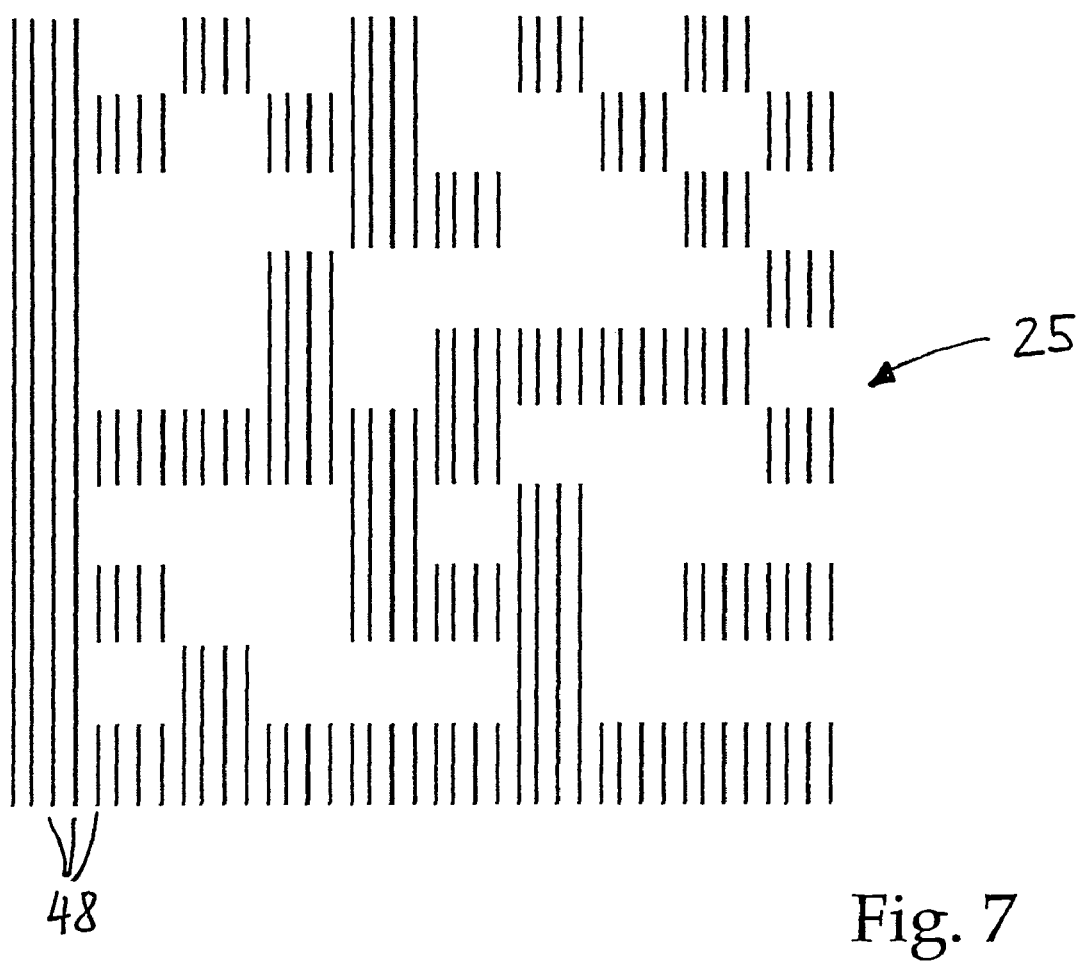
FIG. 7 the writing pattern for the manufacture of a 10×10 point matrix.

FIG. 7 shows the laser trails 48 for the manufacture of a 10×10 point matrix. It may be recognised that there is formed a data column of four laser tracks arranged next to one another, i.e. n data points are divided in 4 n trails.

Figure 8:
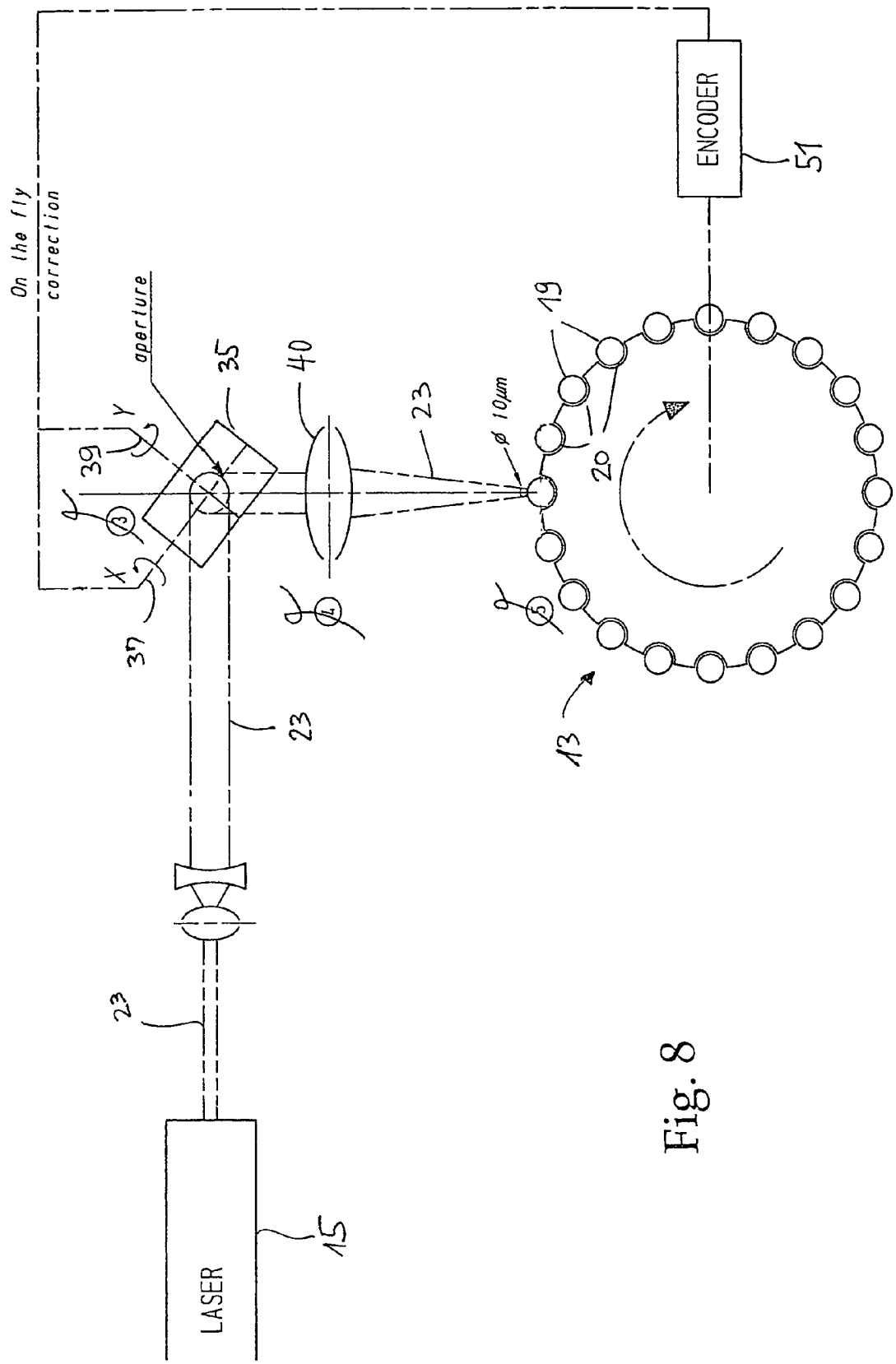
FIG. 8 a principle schematic diagram of a second embodiment form of a laser inscription device.

With the embodiment example of FIG. 8 an encoder 51 provides signals with regard to the movement of the transport device 13 to the control means not shown in more detail, for the scanner mirror 35. The encoder signals permit the laser light beam or its deflection about the X- and Y-axis to be corrected or tracked by the transport speed of the transport device. This allows the glass receptacles to be continuously transported and engraved with code markings. It is further evident from FIG. 7 that the frequency-quadrupled laser light beam exiting the laser housing is firstly expanded and then rectified. The expansion of the laser light beam provides the advantage that the scanner mirror may be impinged with energy densities which are not too great, so that its life duration is increased. The scanner mirror 35 deflects the expanded laser light beam by about 90 degrees. The deflected laser light beam is then focussed to a diameter between 5 and 25 μm, preferably 8 to 15 μm by a convergent lens with a focal width of preferably 150 to 300 mm or by equally acting means in the writing plane.

The coding device 11 is used as follows: A charging robot not shown in more detail or a charging device removes a glass ampoule to be coded from a supply container (not shown) and loads this in the charging position L into a accommodating means of the transport device. A known separating means may also be provided in place of a charging robot, by which means individual glass ampoule get directly into the accommodating means of the transport device, without the transport device having to be stopped. The ampoule is then transported in the transport direction to the coding position R. At this location a preferably two-dimensional point code is engraved into the glass surface by way of a high-energy laser light beam. The laser light beam preferably has a wavelength of 193 nm, 265 nm or 253 nm.

For writing a two-dimensional code the write beam is deflected by the scanner mirror 35 pivotable about the axes 37, 39. The control of the mirror is effected by the computer 47. In a preferred embodiment form for deflection of the mirror 33 one applies adjustable actuators, such as e.g. piezocrystals. The laser beam used for writing is preferably a pulsed laser beam. Such an energy quantity per unit of time and area is transferred into the glass that an uppermost very thin glass layer is removed from the surface of the glass. The laser beam is preferably scanned over the surface of the glass in a raster-like manner such that the light impingement points of successive light impulses only partly overlap. In this manner one may achieve a good contrast ratio with a minimal number of pulses. However it is conceivable that a first number of successive light impulses have the same impingement points on the glass surface, and that a second number of successive light impulses have a second impingement point slightly displaced relative to the first impingement point.

After depositing the code the ampoule is transported further to the read position. The code marking produced in the glass surface is scanned at the read position R. This may be effected by a commercially available inspection system with a CCD camera. The ampoule is preferably illuminated indirectly with light and the diffusely scattered light is detected by the CCD camera. The measurement light may be introduced into the glass parallel or perpendicular to the two-dimensional marking. It is advantageous if the marking is not directly illuminated. For this purpose one may provide a type of shielding or guiding of the light. If the light has once been introduced into the glass, then this is reflected back from the surfaces similar to the light propagation in a glass fibre. Light which impinges the location which is etched or treated by ablation may escape the light and scatter in all directions. The light detected with the help of the CCD camera 17 produces an image of the code marking, e.g. in the form of light points on a dark background. The detected information is then led further to the computer 47. The computer 47 compares the detected code marking to the stored pattern. If the matching of the written code marking with the predefined marking is smaller than a certain threshold value, then the ampoule is rejected as erroneous and the glass receptacle is excluded (arrow R1). If the code marking agrees with the sample pattern, i.e. does not have any errors, then the glass container is transported further to the filling station and filled (arrow R2).

The transport device is preferably continuously operated, i.e. it rotates with a preferably constant speed. The charging and unloading as well as the writing and reading actions accordingly take place continuously.

The device according to the invention in particular serves for the direct inscription of glass receptacles, glass bodies, glass plates, lenses etc. with machine-readable codings, also called 2DMI markings (two-dimensional marker identification). Amongst these are standardised point codings or freely scalable open coding systems which may be adapted to individual requirements. The solution according to the invention is conceived for distinguishing containers and glass receptacles for the pharmaceutical, cosmetic and drinks industry. The point coding envisaged for this usually has the following dimensions:

10×10 point matrix: edge length approx. 1 mm
20×20 point matrix: edge length approx. 2 mm Thus, the average area occupied by a data point is 0.01 mm2.

Individual image points of the above point matrices have corresponding areas of approx. 0.01 to 0.1 $mm^2$. At least 9 laser impulses minimum, typically between 16 and 32 impulses are required for producing an image point.

For performing the method according to the invention the following minimum specifications are recommended:
Capactiy of the machine: 200 pce/min and up
Duration of the marking: 200 ms and down
Energy density of the laser: 10 $GW/m^2$ and up
Frequency of the laser: 10 kHz and up
Datamatrix code: 10×10 cell and up
Datamatrix code: 10×10 cell and up
Focus distance: approx. 200 mm
Size of the datamatrix: 1×1 mm and up
Diameter of the laser dot: approx. 10 μm
Focus "depth" (tolerance): 2 mm and up

LIST OF REFERENCE NUMERALS 11 coding device
13 carousel (transport device)
15 laser system
17 read means (ccd camera)
19 glass receptacle, glass ampoules, or glass bottle or vials
20 accomodating means for ampoules
21 transport direction
23 laser light beam
25 code marking (point code)
27 glass surface
31 housing
33 means 31 for doubling, tripling, or quadrupling the laser base frequency
35 deflection means (scanner mirror)
37 first pivot axis of the mirror 33
39 second pivot axis of the mirror 33
40 focussing lens
41 light source
43 detection field 45 shieldings
47 computer
51 encoder

The invention claimed is:

1. A method for depositing a wipe-proof and rub-proof marking or code marking onto glass or glass receptacles including glass ampoules, syringes, glass bottles, and vials, said method comprising:
producing a laser light beam having a wavelength <380 nm
engraving the marking into the glass or into the glass surface by deflecting a laser light beam in a first and in a second direction,
characterised in that
glass receptacles $O_n$ are moved along a transport path and in a transport direction, subsequently arbitrarily defined as the x-direction,
at least the position of an object $O_1$ to be individually inscribed is detected or determined at at least one position along the transport path,
along the transport path at a writing position W located at a distance to the laser, the laser light beam is triggered in dependence on the position of the glass receptacle, and a two-dimensional marking $M_a$ stored in a control unit is written into the surface of the object to be inscribed in that the laser light beam is scanned (rastered) over the surface in the x- and y-direction, and
the marking $M_a$ written into the surface of the object at least at one position R located after the writing position seen in the transport direction is read, by producing an increased contrast ratio between the inscribed and uninscribed glass surfaces from light introduced into glass walls of the glass receptacle at a distance to the marking and detecting the scattered light, and compared to the two-dimensional marking $M_a$ stored in the control unit, wherein with a non-agreement between the written and read marking $M_a$ the object is rejected and separated out.

2. A method according to claim 1, characterised in that the laser light beam is deflected in the x- and y-direction with the help of an activatable 2D scanner mirror.

3. A method according to claim 1, characterised in that the focus depth of the laser light beam in the region of the writing surface is set to >0.2 mm.

4. A method according to claim 1, characterised in that the laser light beam is set to an energy density of >2 J/cm².

5. A method according to claim 1, characterised in that an object $O_2$ following the object $O_1$ with the marking $M_a$ is provided with a marking $M_b$, a subsequent object $O_3$ is provided with a marking $M_c$, etc.

6. A method according to claim 1, characterised in that the glass receptacles are transported continuously and preferably with the same transport speed and the laser light beam is tracked according to the transport speed of the objects.

7. A method according to claim 1, characterised in that impingement points of light impulses in each case at least partly overlap.

8. A method according to claim 1, characterised in that each data point or pixel is formed by a plurality of at least partly overlapping laser impulses.

9. A method according to claim 1, characterised in that each data point or pixel is formed of two or more tracks or channels lying next to one another.

10. A method according to claim 1, characterised in that the marking is engraved into the superficies of a glass receptacle or on a neck or at a short distance to the filling opening of the glass receptacles.

11. A method according to claim 1, characterised in that curved surfaces with radii between 3 mm to 50 mm, preferably 5 mm to 30 mm are provided with markings.

12. A method according to claim 1, characterised in that a point coding of n×m square points or pixels are written in a raster scan.

13. A method according to claim 1, characterised in that a liquid or solid substance or a liquid or solid substance mixture is deposited onto the location of the glass to be inscribed before the writing procedure.

14. A method according to claim 1, characterised in that the scattered light is detected with the help of a CCD camera.

15. A method according to claim 1, characterised in that the marking is deposited onto curved surfaces, in particular superficies of glass receptacles which are round in cross section.

16. A device for depositing a wipe-proof and rub-proof marking or code marking onto glass receptacles including glass ampoules, glass bottles, and vials, said device comprising:
a transport means having a drive, with one or more accommodating devices for objects to be inscribed,
a laser system arranged at a distance to the transport means with a laser source for producing a laser light beam of a wavelength <380 nm, said laser light beam in operation being directed onto the transport path and defining an impingement point in the region of at least one accommodating means moved along the transport path,
means in order to change or move the impingement point of the laser light beam with respect to at least one accommodating means of the transport means, by way of at least one deflection means in order to deflect the laser light beam in a first and in a second direction continuously or in certain incremental intervals,
at least one control unit comprising a memory unit and a microprocessor which is in connection with the laser system and the deflection means, for controlling at least the deflection system and the laser system,
characterised in that
the transport means is designed for the transport of glass receptacles to be marked, along a transport path,
a means for detecting or determining at least the position of at least one accommodating means or a glass receptacle accommodated therein is provided at at least one position R along the transport path, said means being in connection with the control unit or the deflection means,
in the memory unit there is stored a program which triggers the laser in dependence on the position of the glass receptacle to be inscribed, as well as at least one marking pattern $M_n$, according to which the deflection means for writing the 2D marking is moved in a first and in a second direction,
a read means is provided or arranged at a defined read position R along the transport path after the laser system in the transport direction, for detecting the marking previously written by the laser system, by producing an increased contrast ratio between the inscribed and uninscribed glass surfaces from light introduced into glass walls of the glass receptacle at a distance to the marking and detecting the scattered light, said read means being in connection with the control unit, and
in the control unit there is further present a program or a program procedure which compares the stored marking pattern to the marking detected by the read means and provides a control signal in dependence on the result of the comparison, at the output of the control unit.

17. A device according to claim 16, characterised in that the position detection means is an encoder, which provides signals or impulses to the control unit or the deflection means, the number of signals or impulses per time unit being dependent on the transport speed of the transport means.

18. A device according to claim 16, characterised in that the transport speed of the transport means is detected by way of the position detection means.

19. A device according to claim 16, characterised in that the drive ensures a uniform transport speed of the transport means.

20. A device according to claim 16, characterised in that the program of the control unit or the deflection means on writing tracks the laser beam in dependence on the transport speed of the transport means, in the transport direction.

21. A device according to claim 16, characterised in that in the beam path of the laser light beam there are provided focusing means, e.g. a convergent lens, a concave mirror or likewise, which focus the laser light beam in a write plane.

22. A device according to claim 21, characterised in that the focusing means, e.g. convergent lens has a focal width f of more that 5 cm, preferably more than 10 cm, and very particularly preferred more than 15 cm.

23. A device according to claim 16, characterised in that the laser system uses an excimer or Nd YAG laser with frequency multiplication means, in particular means for frequency quadrupling.

24. A device according to claim 23, characterised in that the read means comprises a CCD camera.

25. A device according to claim 23, characterised in that at the read position R of the transport path there is provided at least one light source which is arranged such that in operation only a part of the inscribed glass receptacle, but not the code marking, is directly irradiated.

26. A device according to claim 23, characterised in that at a short distance to the light source there is provided at least one opaque shielding which is designed such that a direct incidence of light onto the read means and the code marking is prevented.

27. A device according to claim 23, characterised in that are provided two light sources lying opposite one another and arranged on oppositely lying sides of the transport path, which are so arranged and in each surrounded by a shielding such that only a part of the glass receptacle, but not the marking written into the glass, is directly irradiated by the light sources.

28. A device according to claim 23, characterised in that the read means is arranged at a distance and essentially preferably perpendicularly or at an angle to the plane defined by the two-dimensional marking.

29. A device for depositing a wipe-proof and rub-proof marking or code marking onto glass or glass receptacles such as glass ampoules, glass bottles, and vials, said device comprising:
   a transport means having a drive, and with one or more accommodating means for the objects to be inscribed,
   a laser system arranged at a distance to the transport means, with a laser source for producing a laser light beam of a wavelength <380 nm, said laser light beam in operation being directed onto the transport path and defining an impingement point in the region of at least one accommodating means moved along the transport path,
   means in order to change the impingement point of the laser light beam with respect to at least one accommodation means of the transport means by way of at least one deflection means in order to deflect the laser light beam in a first and in a second direction continuously or at certain incremental intervals,
   a control unit comprising a memory unit and a microprocessor, which is in connection with the laser system and the deflection means, for controlling at least the deflection system and the laser system,
   characterised in that
      a means is provided for detecting at least the position and preferably the speed of the transport means, said means being in connection with the control unit or the means for deflecting the laser beam,
      in the memory unit there is stored a program which on operation triggers the laser in dependence on the position of the glass receptacle to be inscribed, as well as at least one marking pattern, according to which the deflection means for writing the 2D marking is moved in a first and a second direction, and
      there is provided a program or logic circuit which tracks the laser beam according to the transport speed of the objects to be inscribed.

30. A device according to claim 29, characterised in that a read means is provided or arranged at a defined read position R along the transport path and after the laser system in the transport direction, for detecting the marking previously written by the laser system, by producing an increased contrast ratio between the inscribed and uninscribed glass surfaces from light introduced into glass walls of the glass receptacle at a distance to the marking and detecting the scattered light, said read means being in connection with the control unit.

31. A device according to claim 29, characterised in that in the control unit there is further present a program or a program procedure which compares the stored marking pattern to the marking detected by the read means and provides a control signal in dependence on the result of the comparison at the output of the control unit.

32. A method according to claim 1, wherein the engraving the masking into the glass or into the glass surface comprises producing recesses of at most 20 μm in the glass.

33. A device according to claim 16, wherein the marking produces recesses of at most 20 μm in the glass.

34. A device according to claim 29, wherein the marking produces recesses of at most 20 μm in the glass.

35. A device for depositing a wipe-proof and rub-proof marking or code marking onto glass receptacles including glass ampoules, glass bottles, and vials, said device comprising:
   transport means having a drive, with one or more accommodating devices for objects to be inscribed,
   a laser system arranged at a distance to the transport means with a laser source for producing a laser light beam of a wavelength <380 nm, said laser light beam in operation being directed onto the transport path and defining an impingement point in the region of at least one accommodating means moved along the transport path,
   means in order to change the impingement point of the laser light beam with respect to at least one accommodation means of the transport means by way of at least one deflection means in order to deflect the laser light beam in a first and in a second direction continuously or in certain incremental intervals, focusing means in order to focus the laser beam onto the writing surface or write plane, a control unit comprising a memory unit and a microprocessor, which is in connection with the laser system and the deflection means, for controlling at least the deflection system and the laser system, characterised in that by way of the focusing means one may produce a focus depth of more than 0.2mm.

36. A device according to 35, characterised in that the energy density of the laser beam in the region of the focus depth is >2 J/cm$^2$.

* * * * *